July 25, 1961  P. R. STAPLES  2,993,263
METHOD OF EXPANDING PRESSURE WELDED PASSAGEWAY PANELS
Filed Jan. 20, 1958  2 Sheets-Sheet 1

*INVENTOR.*
PAUL R. STAPLES
BY
ATTORNEY

July 25, 1961  P. R. STAPLES  2,993,263
METHOD OF EXPANDING PRESSURE WELDED PASSAGEWAY PANELS
Filed Jan. 20, 1958  2 Sheets-Sheet 2

INVENTOR.
PAUL R. STAPLES
BY Arthur H. Robert
ATTORNEY

United States Patent Office 2,993,263
Patented July 25, 1961

2,993,263
METHOD OF EXPANDING PRESSURE WELDED PASSAGEWAY PANELS
Paul R. Staples, Louisville, Ky., assignor to Reynolds Metals Company, Richmond, Va., a corporation of Delaware
Filed Jan. 20, 1958, Ser. No. 709,816
2 Claims. (Cl. 29—157.3)

This invention relates to a method of expanding pressure welded passageway panels on one side.

When a pressure welded passageway panel, composed of two sheets of aluminum of identical composition and gauge, is expanded on one side only, the flat passageway walls on its flat side are mechanically weaker than the arched passageway walls on its expanded side. As a consequence, the flat passageway walls will bulge outwardly whenever the panel is subjected to high internal pressures as is normally the case when it is tested for leaks, etc. Since this is highly objectionable, it has been proposed to increase the gauge of the sheet metal used on the flat side in order to strengthen the passageway walls on that side to the requisite degree. This also is objectionable primarily because it increases the weight of aluminum required for a given panel a minimum of about 14%.

The primary object of this invention is to reduce this weight increase in a substantial measure and possibly eliminate it completely, and, more particularly, to provide a one side expansion method which effects a mechanical working of the metal on the flat side of the panel to a degree substantially increasing its strength and hardness and thereby permitting its thickness to be reduced.

A further object is to provide a highly economical method of making a pressure welded passageway panel having a flat side which effectively resists high internal test pressures and the like.

In accordance with my invention, both sides of an unexpanded passageway panel are partially expanded and then the slightly arched passageway walls on the "flat" side of the panel are forced back into a flat condition or state. After this is done, the one side expansion operation proceeds in the normal way to a completion. It will be appreciated that this technique substantially increases the mechanical strength of the flat walls because it mechanically works the metal in those walls first by expanding them outwardly to a slight extent and then by reflattening them.

The invention is illustrated in the accompanying drawings wherein.

Figure 1:
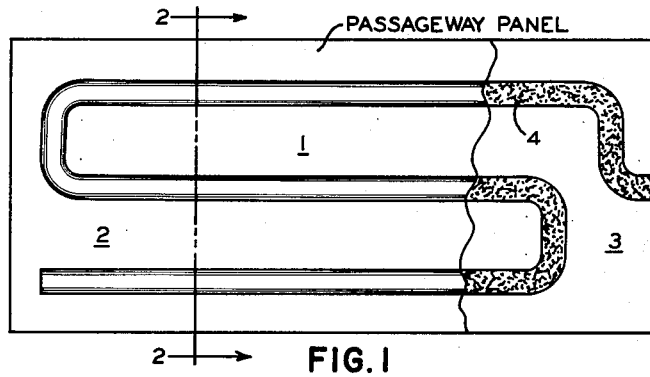
FIG. 1 is a partly cut-away face view of a pressure welded passageway panel before being expanded.
Figure 2:
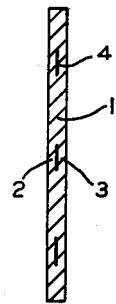
FIG. 2 is a section taken on lines 2—2 of FIG. 1.

A conventional method of making an unexpanded pressure welded passageway panel, such as the panel 1 illustrated in FIGS. 1 and 2, is described in the Long patent, No. 2,662,273, dated Dec. 15, 1953. The panel 1 comprises: an upper metal sheet 2; a lower metal sheet 3; a passageway pattern 4 of weld-resist material sandwiched between the sheets 2 and 3 with the facing areas of the sheets welded together except along the areas separated by the pattern 4. The pattern 4 extends to an edge of the panel 1 to provide an inlet 5 for introducing an expansion fluid pressure into the panel to expand or dilate its non-welded internal areas which are also designated by the number 4.

Figure 4:
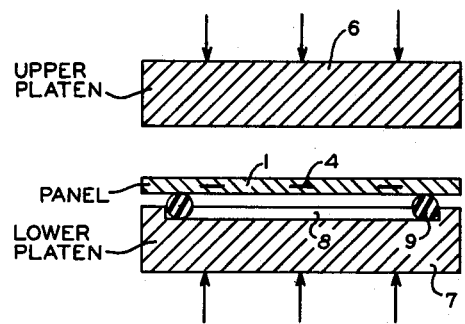
FIG. 4 is a section taken on lines 4—4 of FIG. 3.

The apparatus used to perform my panel expansion method is conventional and comprises a pair of parallel platens preferably mounted for relative movement toward and away from each other between an "open" position in which a panel may be inserted into and removed from the space between platens and a "closed" position in which the panel is tightly gripped between the platens. The upper platen 6 illustrated in the drawings is flat while the lower platen 7 contains a flat-bottomed pan-like cavity 8. A ring gasket 9 of elastic material is mounted in the cavity 8 along its sides. It is dimensioned, in an uncompressed condition, to extend above the cavity sides as seen in FIG. 4. The cavitied platen is only shown as the lower platen in the drawings for purposes of illustration and the invention can be practiced as well with the cavitied platen being the upper platen.

Figure 3:
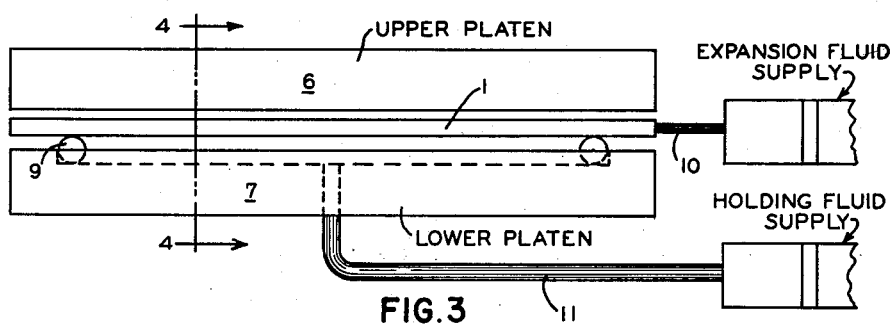
FIG. 3 is a schematic elevational view of the panel of FIG. 1 positioned between a pair of "open" platens used to support the panel while its passageways are being expanded.
Figure 5:
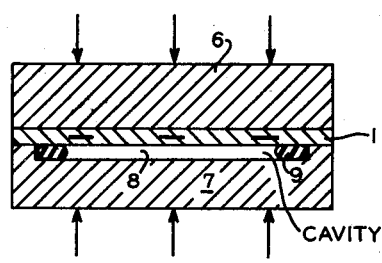
FIG. 5 is a section similar to FIG. 4 showing the platens "closed" on the panel.

The passageway panel 1 is positioned between the "open" platens 6 and 7 to cover the cavity 8 with its marginal portions resting on the gasket ring 9 as is illustrated in FIG. 3. An expansion fluid pressure conduit 10 is connected directly to the inlet 5 while a holding fluid pressure conduit 11 is connected to the cavity 8 through the lower platen 7. The platens 6 and 7 are then closed on the panel 1 as shown in FIG. 5 whereby the gasket ring 9 is compressed between the bottom face of the panel 1 and the bottom of the cavity 8 and the upper platen 6 is brought downwardly into flush engagement with the upper face of the panel. The panel 1 covers the cavity 8 while the compressed gasket ring 9 seals the periphery of the cavity. All of the foregoing apparatus and method steps are conventional and known to the art of expanding pressure welded passageway panels on a single face.

In practicing my invention, a holding fluid under low pressure normally is fed to cavity 8 through the conduit 11. This low holding fluid pressure may vary from atmospheric pressure to about 500 p.s.i. This will not change the panel's shape and it will remain as depicted in FIG. 5.

Figure 6:
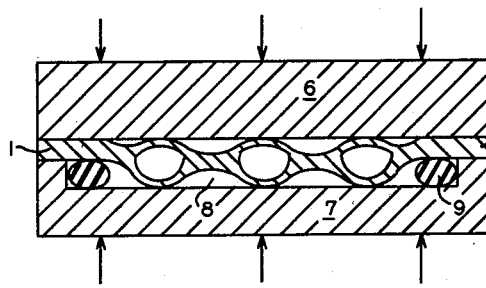
FIG. 6 is a section similar to FIG. 5 after the panel's passageways have been partly expanded on both panel faces.
Figure 7:
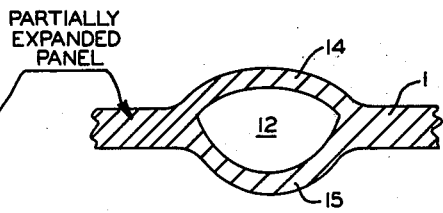
FIG. 7 is an enlarged fragment of FIG. 6 showing the walls of a passageway.

Next expansion fluid under low pressure is fed through the conduit 10 to the unwelded internal areas 4 of the passageway panel 1. The pressure of this expansion fluid pressure is higher than that of the holding fluid and normally will vary from about 600 p.s.i. to 1500 p.s.i. This will expand the passageways 12 on both faces of the panel 1 but, due to the holding pressure, the upper passageway walls 14 will be expanded to a lesser degree than the lower passageway walls 15 as represented in FIGS. 6 and 7. During this operation, the upper face of the panel is distorted and thus pulled away from the upper platen 6 because the holding pressure is insufficient to keep the upper passageway walls 15 from expanding somewhat.

After the panel has been slightly but sufficiently distorted, the holding fluid pressure is increased to a relatively high value varying from 600 p.s.i. upwardly. Normally a differential of 1500 to 2500 p.s.i. is maintained between the maximum values of the holding and expansion pressures; hence, where an expansion pressure of 3200 p.s.i. is to be used, a maximum holding pressure of 700 to 1700 p.s.i. is indicated. Within practical limits, progressively better results are obtained with progressively higher holding pressures but good results usually may be obtained with a holding pressure of 1,000 p.s.i.

Figure 8:
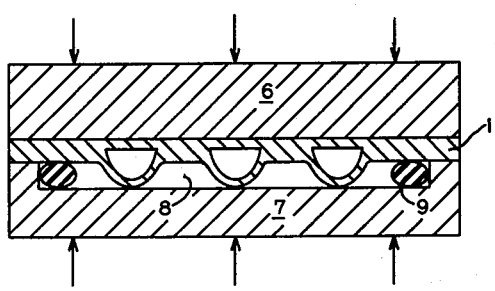
FIG. 8 is a section similar to FIG. 6 after the top face of the passageway panel has been flattened.
Figure 9:
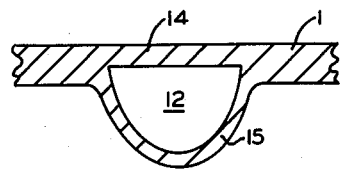
FIG. 9 is an enlarged fragment of FIG. 8 showing the walls of a passageway.
Figure 10:
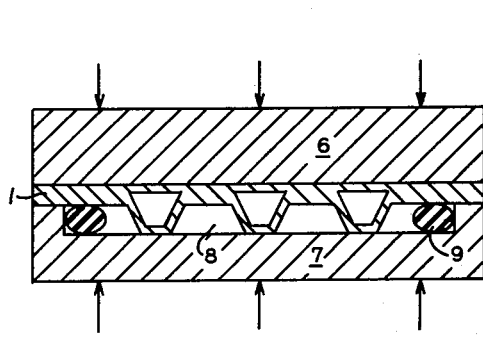
FIG. 10 is a section similar to FIG. 8 after the panel's passageways have been fully expanded on the bottom panel face.
Figure 11:
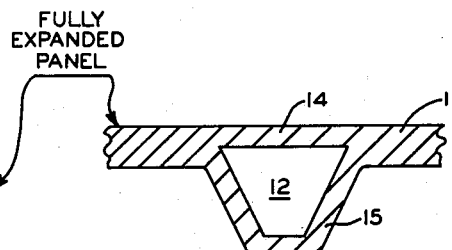
FIG. 11 is an enlarged fragment of FIG. 10 showing the walls of a passageway.

This holding pressure, exerted upwardly against the lower face of the panel, tends to press the upper face thereof into, and to hold it in, firm, flat or flush face-to-face engagement with the upper platen. Since this upwardly directed holding force is substantially higher than the initial or "low" holding pressure, it will cause the arched upper passageway walls 14 to be flattened against the upper platen as shown in FIGS. 8 and 9. The original expansion or bulging of the upper passageway walls 14, together with this reflattening of those same walls, effects a working of the metal composing the walls 14 and consequently increases the mechanical strength of such walls.

The completion of the working and reworking operation is followed by the final expansion step wherein the expansion fluid pressure is increased from its low value to a relatively high value normally ranging between 3,000 and 4500 p.s.i. This increase in expansion pressure causes the lower passageway walls 15 to be expanded downwardly into engagement with the bottom of the cavity 8 preferably to an extent causing the lowermost portions or crests of such passageways 15 to be flattened. During this expansion operation, the relatively high holding fluid pressure keeps the upper side of the panel in firm, flat face-to-face engagement with the upper platen and thus prevents the upper passageway walls 14 from being expanded.

Both the holding fluid pressure and the expansion fluid pressure are finally released in a suitable manner to keep the panel 1 from being additionally deformed, the platens 6 and 7 are opened and the expanded panel 1 is removed. The platens are now ready to receive the next panel 1 to be expanded.

It will be understood that the magnitudes of the fluid pressures used in my method will depend on many factors such as the gauge and composition of the metal sheet being expanded, the width of the passageways in the panel and the height of the final expanded passageways. The specific pressures set forth in the description of this method are given as appropriate examples of what will probably be used in the expansion of an aluminum pressure welded panel and are not to be construed as limiting the invention. While we have thus far mentioned fluid pressure, it will be understood that hydraulic pressures are normally preferred and used. Also the initial distortion expansion of the panel may occur without any holding pressure because the initial application of a low holding pressure is not essential.

Thus, the expansion of a pressure welded passageway panel by this process provides a panel expanded on one side wherein the flat walls of the passageways are stronger than the corresponding walls of an equivalent panel expanded by the conventional one-side expansion process in which the flat side of the panel was kept flat throughout the expansion operation. This increase in strength is due to the working of the flat walls of the passageways during their partial expansion and re-flattening. As previously explained, this increase in strength allows a reduction in the initial thickness of the metal sheet forming the flat side of the panel and, consequently, makes the one-side expanded panel more economical.

Having described my invention, I claim:

1. A method of expanding an unexpanded passageway panel between cooperative platens, one of which is provided with a holding pressure cavity, comprising: providing an unexpanded passageway panel composed of a ductile sheet metal capable of being strengthened by being mechanically worked; clamping the panel between platens with one face of the panel closing the cavity of said one platen and being in sealed relationship therewith and with the other panel face in face-to-face engagement with the other platen; partially expanding the passageway walls on both faces of said panel by introducing and holding an expansion fluid pressure in its passageways; feeding a holding fluid into said cavity under pressure to press said one face toward said other platen and thereby flatten the partially expanded passageway walls on said other face back into firm face-to-face engagement with said other platen; increasing the expansion fluid pressure to effect the desired expansion of the passageway walls on said one face of said panel while holding said other face in firm face-to-face engagement with said other platen; releasing said expansion and holding pressures in a manner to avoid further deforming said panel; and removing said panel from between said platens.

2. The method of claim 1 including: before partially expanding said passageway walls, feeding a holding fluid into said cavity under an intermediate pressure which is insufficient to hold said other face in firm face-to-face engagement with said other platen; and maintaining said intermediate holding pressure during partial expansion.

References Cited in the file of this patent

UNITED STATES PATENTS

| | | |
|---|---|---|
| 1,561,312 | Cutler | Nov. 10, 1925 |
| 2,212,481 | Sendzimir | Aug. 20, 1940 |
| 2,284,773 | Sivian et al. | June 2, 1942 |
| 2,498,275 | Johnson | Feb. 21, 1950 |
| 2,662,273 | Long | Dec. 15, 1953 |
| 2,690,002 | Grenell | Sept. 28, 1954 |
| 2,835,961 | Neel | May 27, 1958 |
| 2,857,659 | Staples | Oct. 28, 1958 |
| 2,857,660 | Staples | Oct. 28, 1958 |
| 2,866,429 | Staples | Dec. 30, 1958 |